(12) United States Patent
Mizoguchi et al.

(10) Patent No.: US 7,219,763 B2
(45) Date of Patent: May 22, 2007

(54) MICROPHONE ASSEMBLY FITTED TO VEHICLE-MOUNTED CONTROL MODULE PANEL, THAT FITS WELL

(75) Inventors: Seiichiro Mizoguchi, Toyota (JP); Yoshitaka Uchida, Toyota (JP)

(73) Assignee: Kojima Press Industry Co., Ltd., Aichi-ken (JP)

( * ) Notice: Subject to any disclaimer, the term of this patent is extended or adjusted under 35 U.S.C. 154(b) by 236 days.

(21) Appl. No.: 11/008,903

(22) Filed: Dec. 9, 2004

(65) Prior Publication Data

US 2005/0236224 A1  Oct. 27, 2005

(30) Foreign Application Priority Data

Apr. 23, 2004  (JP) .............................. 2004-128207

(51) Int. Cl.
H05K 5/00 (2006.01)
H04R 7/16 (2006.01)
H04R 1/02 (2006.01)

(52) U.S. Cl. ...................... 181/158; 181/148; 181/150; 181/154; 181/171; 381/91; 381/355; 381/357; 381/358; 381/361; 381/365; 381/366

(58) Field of Classification Search ................ 181/158, 181/150, 171, 154; 381/91, 355, 361, 365, 381/366; 439/310, 311
See application file for complete search history.

(56) References Cited

U.S. PATENT DOCUMENTS

| | | | |
|---|---|---|---|
| 4,959,021 A * | 9/1990 | Byrne ......................... 439/310 |
| 5,605,145 A * | 2/1997 | Hannah et al. ......... 128/201.19 |
| 5,829,431 A * | 11/1998 | Hannah et al. ......... 128/201.19 |
| 5,975,933 A * | 11/1999 | Yamaguchi et al. ......... 439/247 |
| 6,352,433 B2 * | 3/2002 | Hayashi ....................... 439/34 |
| 6,681,024 B2 * | 1/2004 | Klein et al. ................. 381/389 |
| 2002/0182896 A1 * | 12/2002 | Welsh et al. .................... 439/1 |

FOREIGN PATENT DOCUMENTS

| | | |
|---|---|---|
| JP | 2003011736 | 1/2003 |
| JP | 2003054325 | 2/2003 |

OTHER PUBLICATIONS

European Search Report dated Aug. 16, 2005 for European Application No. 04025949.1, in the name of Kojima Press Industry Co. Ltd.

* cited by examiner

*Primary Examiner*—Lincoln Donovan
*Assistant Examiner*—Jeremy Luks
(74) *Attorney, Agent, or Firm*—Ganz Law, P.C.

(57) ABSTRACT

A microphone assembly fitted to a panel of a vehicle-mounted control module, provided with a housing for housing a microphone and having an opening section on a surface facing the panel, and a holding case for holding the housing so as to be capable of pivoting, and when inserted into a receptacle provided in the panel the housing pivots so as to seal the opening section to the panel.

4 Claims, 8 Drawing Sheets

PRIOR ART

Fig. 6B

PRIOR ART

Fig. 6C

PRIOR ART

MICROPHONE ASSEMBLY FITTED TO VEHICLE-MOUNTED CONTROL MODULE PANEL, THAT FITS WELL

CROSS-REFERENCE TO RELATED APPLICATION(S) AND PRIORITY REFERENCE

Applicant claims priority under 35 USC Section 119(a)–(d) to Japanese Application No. 2004-128207, filed Apr. 23, 2004 and the entire disclosure including specification, claims, drawings and abstract is incorporated herein by reference.

BACKGROUND OF THE INVENTION

1. Field of the Invention

The present invention relates to a microphone assembly mounted on a control module panel fitted inside a vehicle and having, for example, room lamps and various switches.

2. Description of the Invention

The driver of a vehicle may sometimes make a phone call while traveling, and for such situations generally a hands free microphone and a speaker are used in a vehicle telephone from the point of view of safety. This hands free microphone is a component of a control module, and in many cases is fitted to a panel of the control module as a microphone assembly. In such cases, there is a problem where the microphone picks up surrounding noise such as noise outside the vehicle and vibration noise of the vehicle itself coming in from the rear of the panel.

In this respect, in a related art example (Japanese patent laid-open No. 2003-11736), the extent to which surrounding noise enters a microphone is reduced by using a housing for housing the microphone that has a vibration preventing rubber cover at an outer side. This will be described in more detail below using FIG. 6A to FIG. 6C.

Figure 6A:
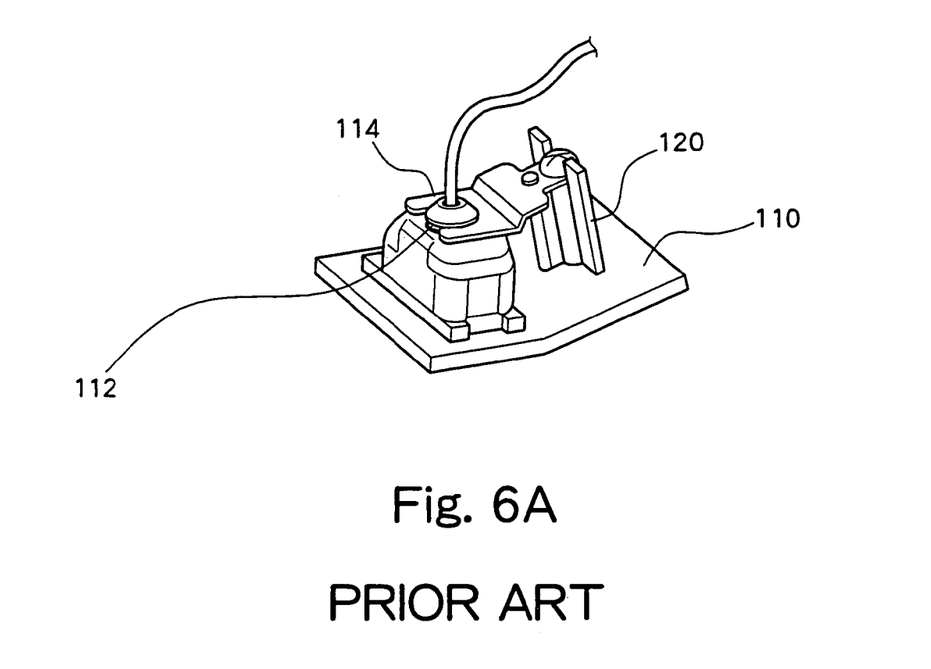
FIG. 6A is a perspective view of a microphone assembly of a related art example fitted to a panel.
Figure 6B:
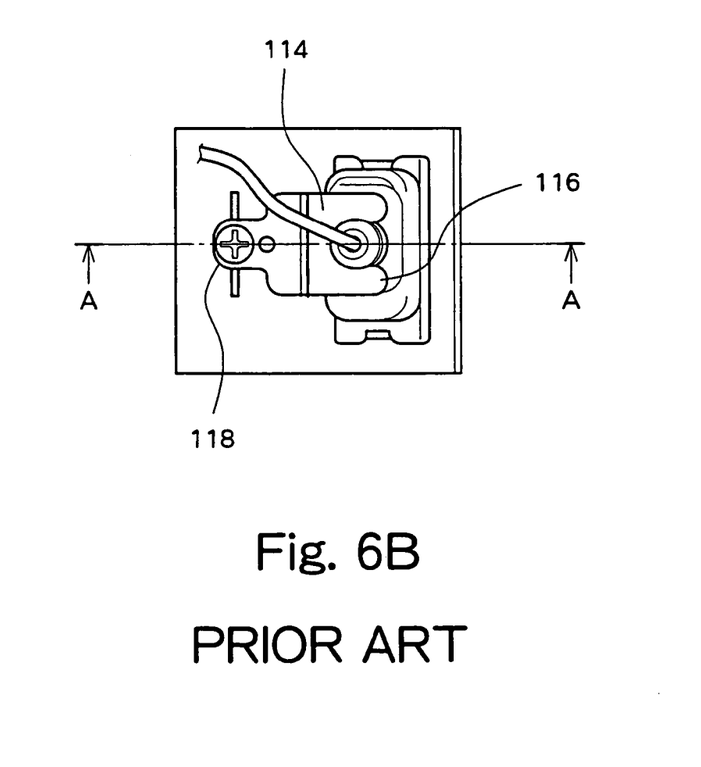
FIG. 6B is a top view of a microphone assembly of the related art example fitted to a panel.
Figure 6C:
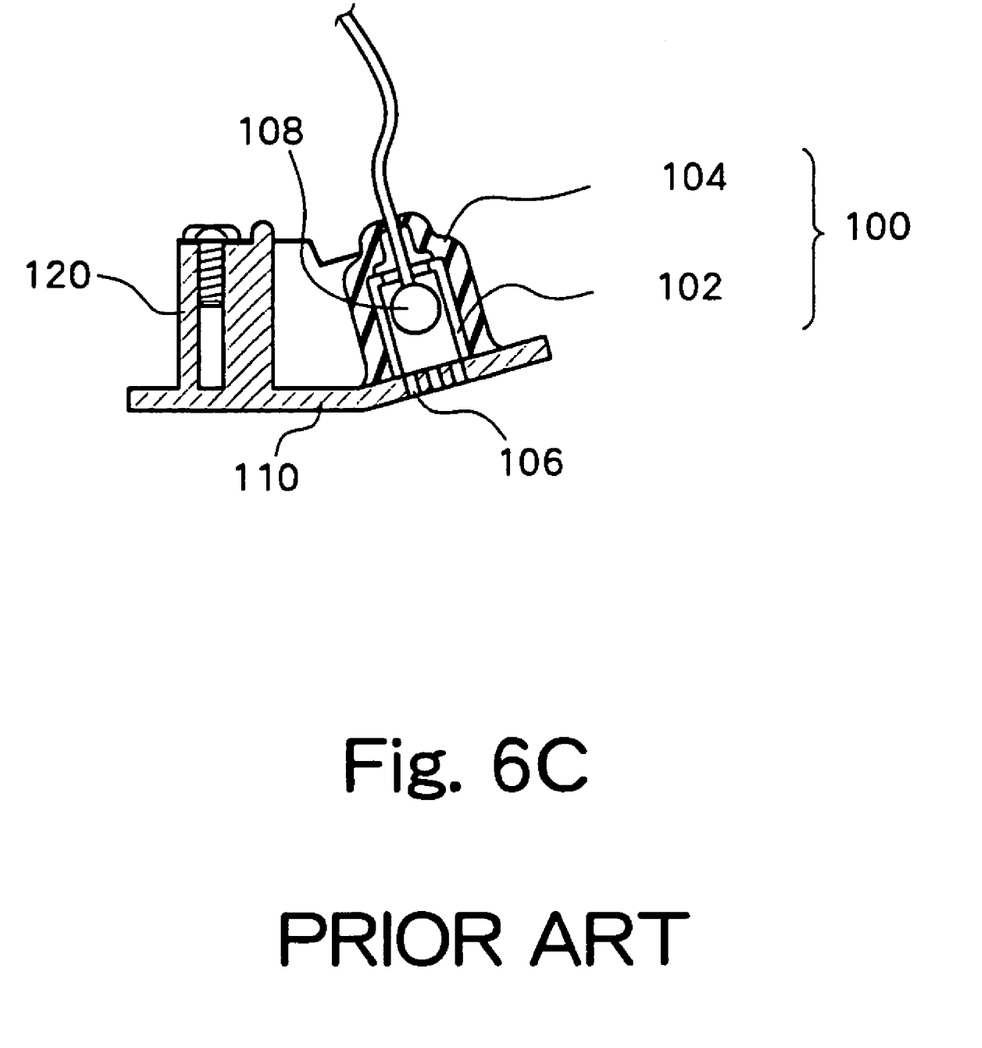
FIG. 6C is a cross section along line A—A of a microphone assembly of the related art example shown in FIG. 6B fitted to a panel.

A microphone assembly housing 100 comprises a hard case 102 for holding a microphone, and a vibration preventing rubber cover 104 arranged so as to cover the hard case. An opening section of this housing 100 is arranged so as to face a sound passing section 106 formed in a panel, and a microphone 108 is fitted into this sound passing section to be able to pick up a voice inside the vehicle. On the other hand, the housing 100 reduces the extent to which surrounding noise enters as a result of passing through the housing 100 by having the vibration preventing rubber cover 104 outside. Also, the vibration preventing cover 104 is elastic, and reduces surrounding noise entering through a gap potentially formed between the panel 110 and the housing 100 (vibration preventing cover 104), by preventing this gap in the first place by sealing the opening section to the panel 110.

With this related art example, using the structure shown in FIG. 6A to FIG. 6C, the housing 100 for the microphone assembly is pressed against the panel. A groove section 112 is provided in the housing 100, and a U-shaped section 116 of a press bracket 114 is fitted into this groove section. On the other hand, a screw fixing section 118 of the press bracket 114 is screwed to a boss section 120 provided on the panel. From the above, the position of the housing 100 with respect to the panel 110 is regulated. The housing 100 is pressed against the panel by flexing pressure of the press bracket 114.

In the structure shown in this related art example, it is necessary to provide a special press bracket dependent on the angle of the panel surface for sealing the microphone assembly housing.

SUMMARY

The present invention is advantageous in that it provides a microphone assembly such that an opening section of a housing for the microphone assembly is sealed according to an angle of a panel surface.

The present invention is a microphone assembly attached to a panel of a vehicle-mounted control module, provided with a housing for housing a microphone and having an opening section on a surface facing the panel, and a holding case for holding the housing so as to be capable of pivoting, and when inserted into a receptacle provided in the panel the housing pivots so as to seal the opening section of the housing to the panel. The microphone assembly housing pivots with respect to the holding case according to the angle of the panel surface to which the microphone assembly is attached. This is advantageous in that the opening section of the housing is sealed to the panel surface.

Here, it is favorable for the opening section of the housing to be constructed of an elastic member. This is advantageous in that the opening section of the housing is reliably sealed to the panel surface by elastic deformation of the opening section of the housing.

For example, it is also preferable to have an outer case formed of a hard member held by the holding case so as to be capable of pivoting, and an inner case formed of an elastic member, arranged inside the outer case, and sealing the opening section to the panel. This is advantageous in that it is possible to reliably arrange the elastic member at the opening section of the housing using a simple structure where the inner case is fitted into the outer case. It is also advantageous in that a gap between the opening section of the housing and the panel surface is prevented.

Also, of the holding case and the panel, it is preferable for one to be provided with engagement hooks and the other to be provided with engagement grooves, so that if the microphone assembly is inserted into a receptacle provided in the panel, the microphone assembly is fixed to the panel by engaging the engagement hooks and the engagement grooves. This is advantageous in that the microphone assembly is sealed in "one touch" to the panel simply by providing the receptacle at the panel side and respectively providing hook sections or groove sections for engagement for the receptacle and the microphone assembly.

These and other embodiments are described in more detail in the following detailed descriptions and the figures.

The foregoing is not intended to be an exhaustive list of embodiments and features of the present invention. Persons skilled in the art are capable of appreciating other embodiments and features from the following detailed description in conjunction with the drawings.

BRIEF DESCRIPTION OF THE DRAWINGS

Preferred embodiment(s) of the present invention will be described in further detail based on the following drawings, wherein.

DESCRIPTION OF THE PREFERRED EMBODIMENTS

Figure 1:
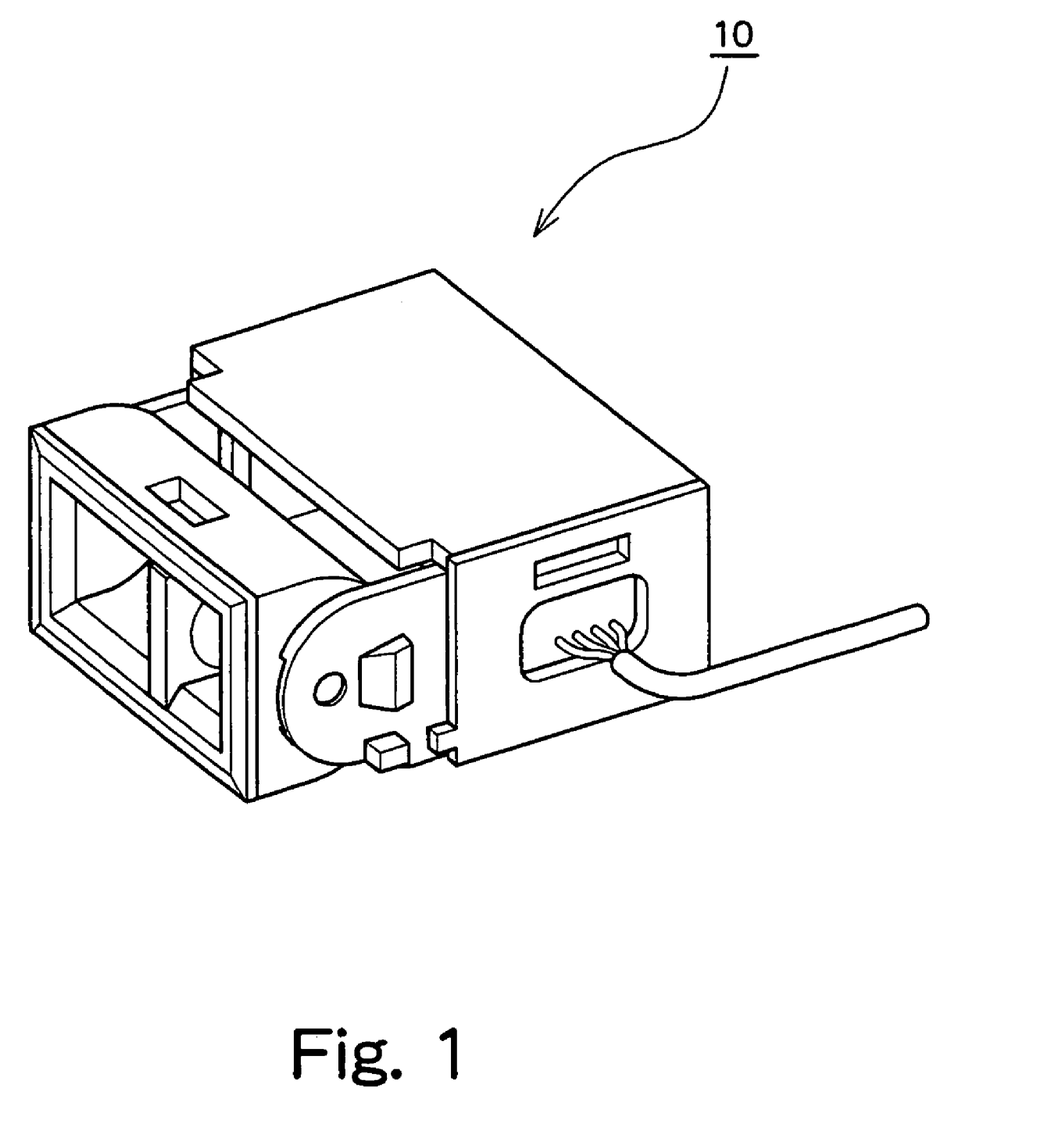
FIG. 1 is a perspective view of a microphone assembly of this embodiment.
Figure 2:
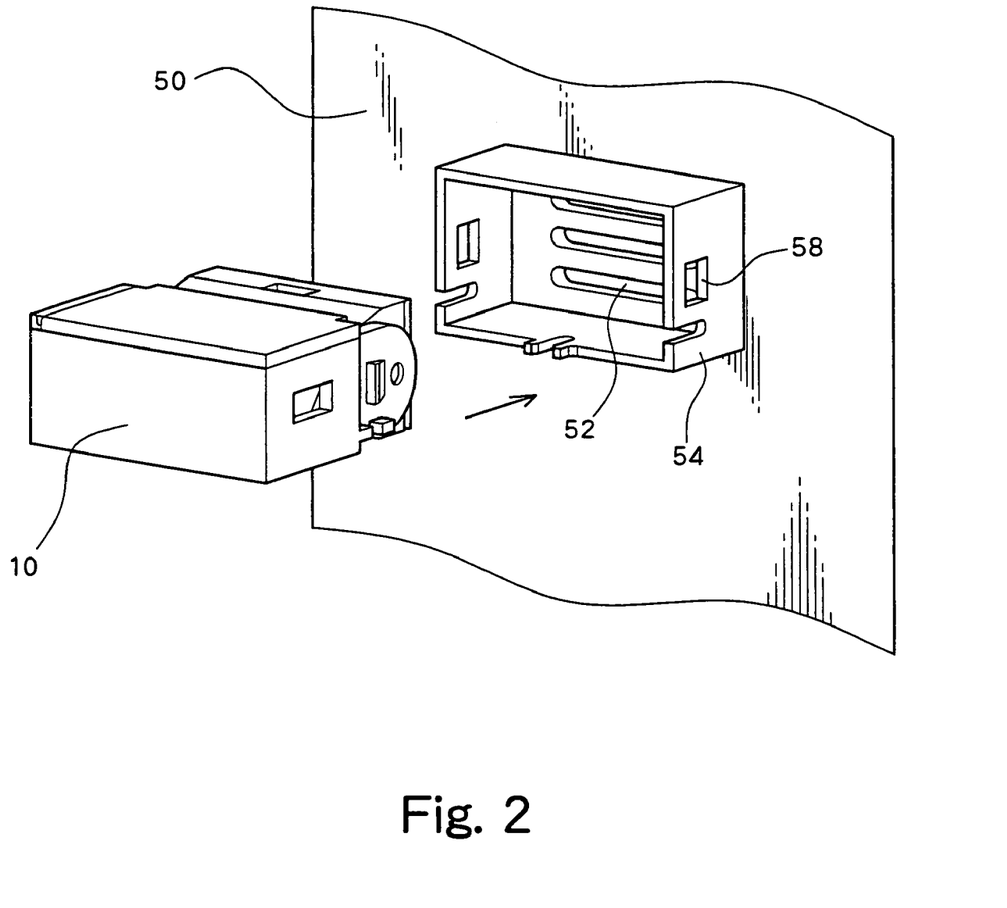
FIG. 2 is an assembly drawing of when fitting the microphone assembly of this embodiment into a panel receptacle.
Figure 3:
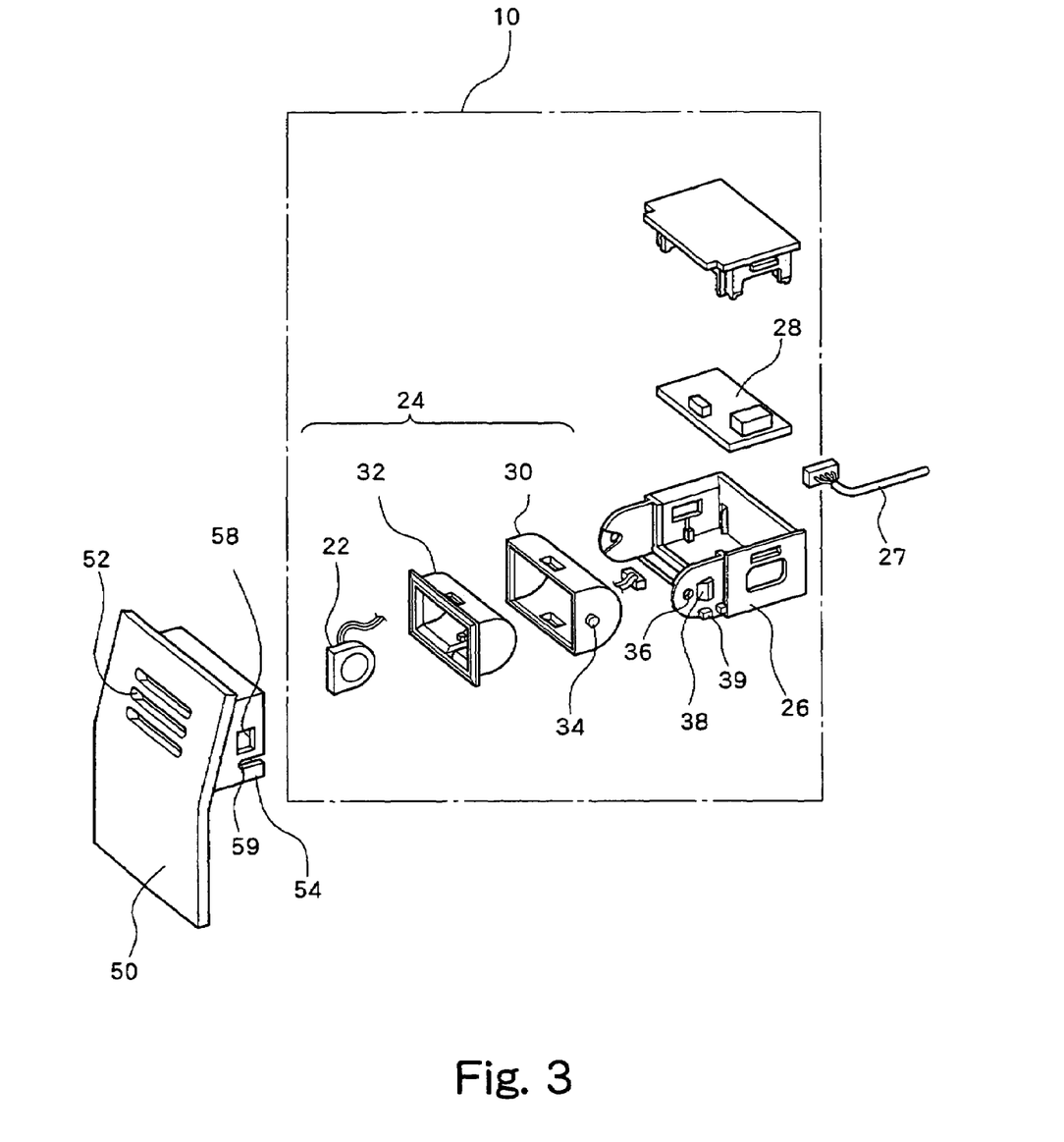
FIG. 3 is an exploded perspective view of a microphone assembly and fitted panel of this embodiment.
Figure 4A:
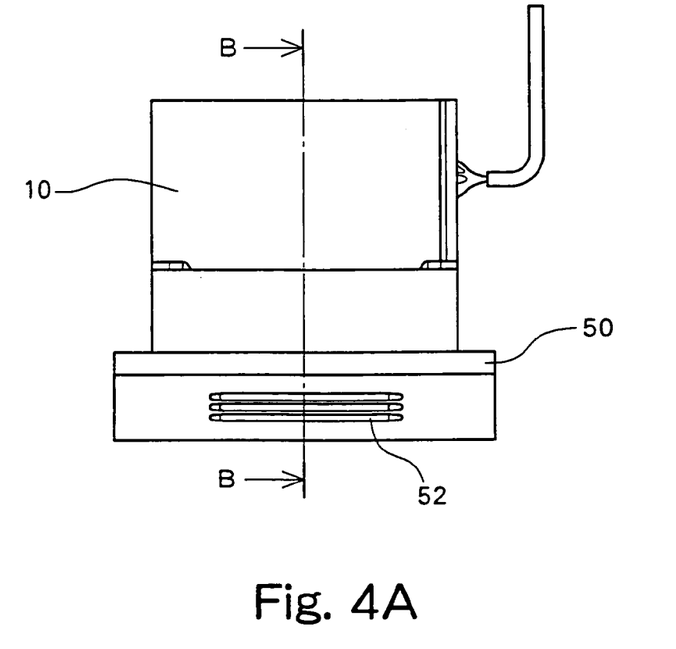
FIG. 4A is a top view of a microphone assembly of this embodiment fitted to a panel.
Figure 4B:
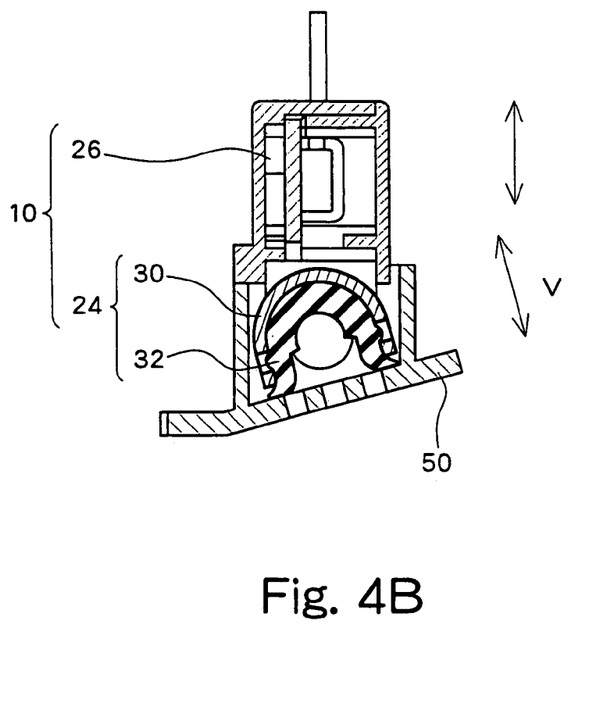
FIG. 4B is a cross section along line B—B of the microphone assembly fitted to a panel shown in FIG. 4A.
Figure 5A:
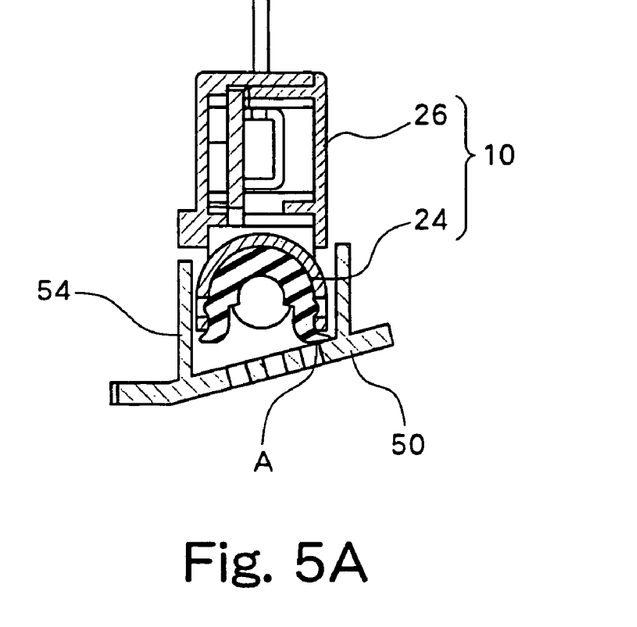
FIG. 5A is a drawing showing a state where a section of the opening section of the housing close to the panel comes into contact with the panel rear surface, of this embodiment.
Figure 5B:
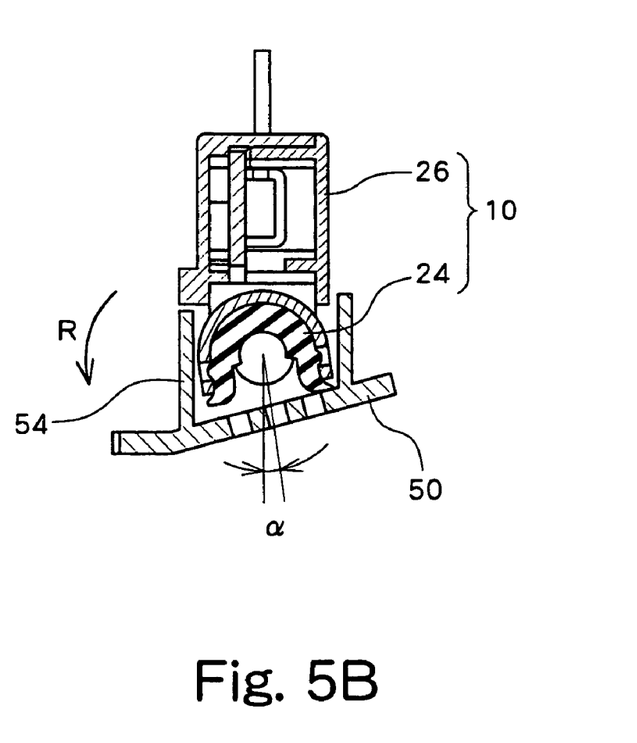
FIG. 5B is a drawing showing a state where the housing is pivoted with respect to a holding case with the contact section shown in FIG. 5A as a force application point, of this embodiment.
Figure 5C:
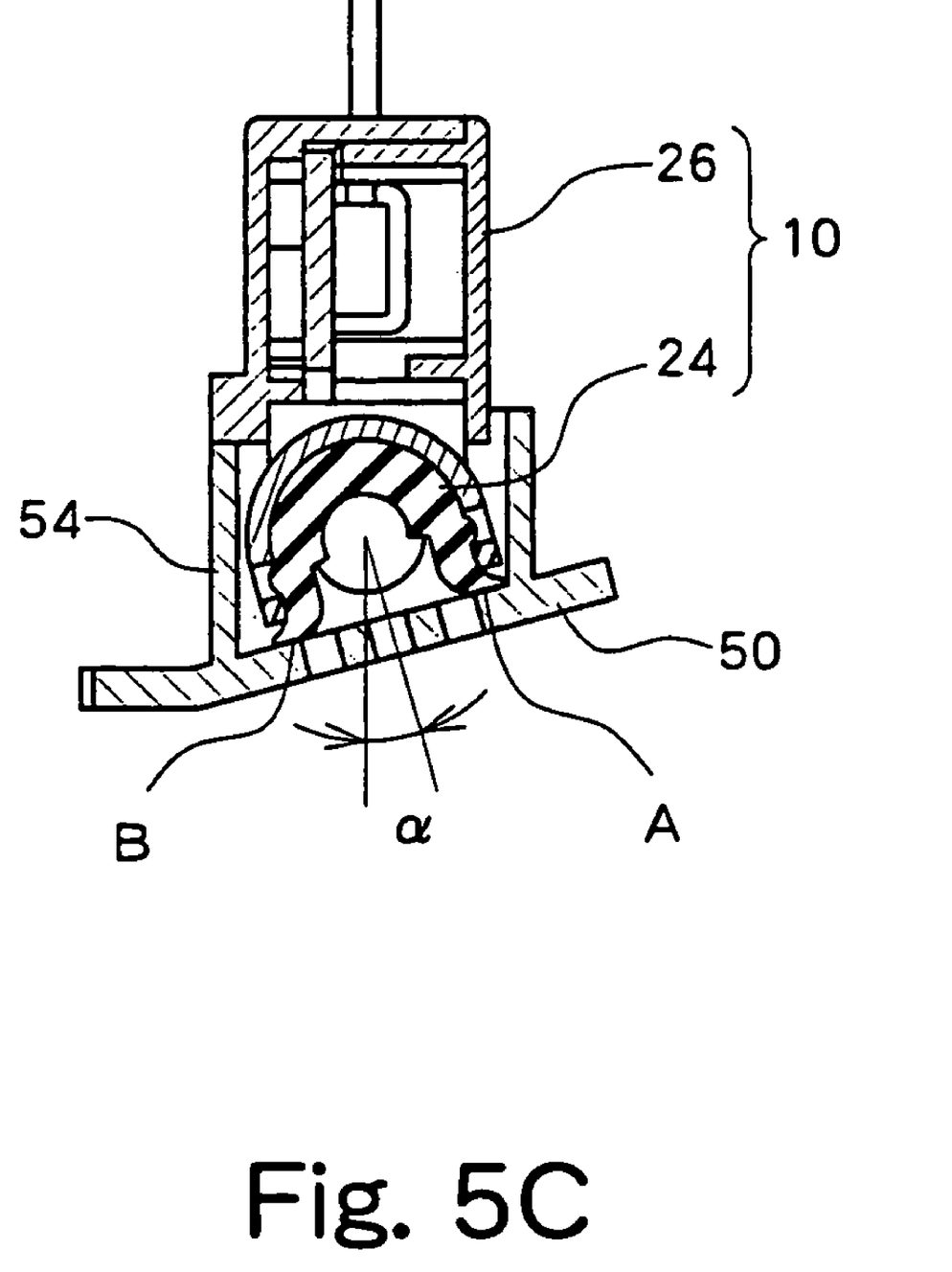
FIG. 5C is a drawing showing a state where the entire opening section of the housing is sealed to the panel rear surface, of this embodiment.

In the following the preferred embodiments of the present invention will be described with reference to the drawings. FIG. 1 is a perspective view of a microphone assembly of this embodiment, and FIG. 2 is an assembly drawing of the microphone assembly fitted into a panel receptacle. FIG. 3 is an exploded perspective view of a microphone assembly and fitted panel, and shows each component of the microphone assembly and a panel of a control module. FIG. 4A is a top view of a microphone assembly fitted to a panel, and FIG. 4B is a vertical cross section looking from the direction of arrow B. FIG. 5A to FIG. 5C are drawings showing operation of a housing when fitting the microphone assembly to the panel.

A perspective view of the microphone assembly of this embodiment is shown in FIG. 1. This microphone assembly 10 is presumed to be fitted to a panel 50 of a control module located inside a vehicle interior. Regarding components of the control module, they are generally interior lamps, various switches and a hands free microphone etc., and the microphone assembly of this embodiment is attached to a panel rear surface of the control module as a hands free microphone. As shown in FIG. 2, a sound passing section 52 is provided in the panel 50, and sound inside the vehicle enters the panel rear surface. A receptacle 54 of the microphone assembly is also provided on the rear surface of the panel 50. The microphone assembly 10 of this embodiment is fitted to a panel rear surface by being inserted into this receptacle 54.

Next, each component constituting the microphone assembly of this embodiment will be described with reference to FIG. 3. The microphone assembly 10 is made up of a microphone or microphone element 22, a housing 24 and a holding case 26. The microphone 22 has a function of picking up sound, converting the sound to an electrical signal, and then outputting to a microphone amplifier that will be described later. The housing 24 houses the microphone 22, and has an opening section in a surface facing the panel 50. This housing 24 is held capable of pivoting with respect to the holding case 26. The holding case 26 has a section for holding the housing 24 and a section for housing the microphone amplifier 28, and is provided with a window so that it is possible to connect a harness 27 to a case inner section. The microphone amplifier 28 is connected by the harness to the microphone 22 and to the vehicle side, receives input of a voice signal from the microphone 22, amplifies this voice signal and supplies output to the vehicle side.

Here, a detailed description will be given of the structure of the previously described housing. The housing 24 comprises an outer case 30 made of a hard member, and an inner case 32 made of an elastic member. The inner case 32 is arranged so as to cover the inner surface of the outer case 30 and the edge of the opening section, and directly houses the microphone 22. It is possible to use a member such as rubber or elastomer for the elastic member of the inner case. On the other hand, the outer case 30 is formed from a hard member, and is held capable of pivoting with respect to the holding case 26. Circular projections 34 are provided on both sides surfaces of the outer case 30, while circular grooves 36 are provided on both side surfaces of the holding case 26. The outer case 30 is connected to the holding case 26 by fitting the projections 34 into the grooves 36 of the holding case 26. It is also possible to pivot (turn) the outer case 30 backwards and forwards with respect to the holding case 26, with the connection sites as a fulcrum.

Next, a structure for fixing the microphone assembly 10 to the panel will be described. As shown in FIG. 3, with this embodiment, engagement hooks 38 are provided on the holding case 26 and engagement grooves 58 are provided in the receptacle 54 of the panel. Also, guide hooks 39 are provided on the holding case 26 and guide grooves 59 are provided in the receptacle 54 of the panel. The direction of inserting the microphone assembly 10 into the receptacle 54 of the panel is regulated by the guide hooks 39 of the holding case and the guide grooves 59 of the receptacle. If the microphone assembly 10 is inserted, the engagement hooks 38 of the holding case 26 are fitted into the engagement grooves 58 of the receptacle and engaged. In this way, the microphone assembly 10 has its position with respect to the panel 50 regulated, and is fixed.

Operation and effects based on the above described structure will now be described.

With this embodiment, a description will be given for the case where, when the microphone assembly is inserted into the receptacle provided in the panel, the "housing" is "pivoted" with respect to the holding case so as to seal the opening section of the housing to the panel.

Operation of the housing 24 in a process of inserting the microphone assembly 10 into the receptacle provided in the panel will be described with reference to FIG. 5A to FIG. 5C. First of all, if the microphone assembly 10 is inserted into the receptacle 54 of the panel, part of the opening section (a part A shown in FIG. 5A) of the housing 24 comes into contact with the panel rear surface. Upon further insertion, the housing 24 is pivoted (FIG. 5B) in the direction shown by arrow B in FIG. 5B with respect to the holding case 26, with the contact position as a force application point, so that the opening section runs along the panel surface. When finally inserted, the housing 24 has the entire opening section (positions A and B shown in FIG. 5C) sealed to the surface of the panel 50. As described above, with this embodiment, the housing 24 pivots with respect to the holding case 26 according to the angle of the surface of panel 50 and the opening section is sealed.

Therefore, the opening section of the housing 24 of this embodiment can be sealed to the surface of the panel, according to the angle of the panel. For example, as shown in FIG. 4A and FIG. 4B, even in the case where the angle of insertion of the microphone assembly 10 (the direction shown by the arrow I in FIG. 4B) and the normal angle of the surface of the panel 50 to which the opening section of the housing 24 is sealed (direction shown by arrow V in FIG. 4B) are different, it is possible to seal the opening section of the housing to the panel surface.

As a result, it is possible to fit microphone assemblies of the same shape to panels having different panel surface angles, making it possible to improve part commonization.

Also, it is no longer necessary to provide a dedicated press bracket depending on the angle of the panel surface. In this way it is possible to reduce the number of components.

FIG. 3 shows a housing that includes an "outer case" formed from a "hard member" and an "inner case" formed from an "elastic member", and the inner case is arranged so as to cover the inner side of the outer case and the edge of the opening section. This embodiment will be described in the following.

As has been described above, in a process of inserting the microphone assembly 10 into the receptacle 54 of the panel, the entire opening section of the housing 24 is sealed to the rear surface of the panel 50, and the microphone assembly 10 is fixed (FIG. 5C). At this time, as shown in FIG. 4, the edge of the opening section of the elastic inner case 32 is sandwiched between the edge of the opening section of the hard outer case 30 and the rear surface of the panel 50. By pressing the inner case 32 completely around the opening section (edge section) of the outer case 30 formed with a hard member, the opening section of the inner case 32 is elastically deformed.

With this embodiment therefore, it is possible to reliably arrange the elastic member at the opening section of the housing 24 using a simple structure where the inner case 32 is fitted into the outer case 30. The opening section of the housing 24 can be reliably sealed to the surface of the panel 50 by this elastic deformation. In this way, it is possible to prevent a gap between opening section of the housing 24 and the surface of the panel 50.

As a result, it is possible to reduce surrounding noise behind the panel entering into the inside of the housing through this gap, and it is possible to reduce the extent to which the microphone picks up surrounding noise.

Also, with this embodiment, the feature where hooks for "engagement" are provided on the "holding case" of the microphone assembly and grooves for "engagement" are provided in the receptacle of the "panel", and the panel and the microphone assembly are fitted and fixed by engaging the engagement hooks and engagement grooves when inserting the microphone assembly into the panel receptacle will be described in the following.

As has been described above, in a process of inserting the microphone assembly 10 into the receptacle 54 of the panel, the microphone assembly 10 is inserted as far as possible (FIG. 5C). At this time, the elastic body of the housing 24 is subjected to a compressive force and is deformed. With the opening section in a compressed state, engagement hooks 38 of the holding case 26 and engagement grooves 58 of the receptacle 54 of the panel are engaged. In this way, the microphone assembly 10 seals and fixes the opening section to the panel 50.

Therefore, with this embodiment, if the microphone assembly receptacle 54 is arranged in the panel 50, by respectively providing hooks and grooves for engagement in the panel receptacle 54 and the microphone assembly 10, it is possible to easily fit the microphone assembly in "one touch".

As a result, it is possible to simplify the process of assembling the microphone assembly. It is therefore possible to improve productivity of a control panel.

Persons skilled in the art will recognize that many modifications and variations are possible in the details, materials, and arrangements of the parts and actions which have been described and illustrated in order to explain the nature of this invention and that such modifications and variations do not depart from the spirit and scope of the teachings and claims contained therein.

What is claimed is:

1. A microphone assembly attached to vehicle-mounted control module panel, comprising:
    a microphone;
    a housing for housing the microphone, and having an opening section in a surface facing a panel; and
    a holding case for holding the housing capable of pivoting, wherein
    when the microphone assembly is inserted into the receptacle provided in the panel, the housing is pivotable with respect to the holding case so as to seal the opening section of the housing to the panel.

2. The microphone assembly of claim 1, wherein
    the opening section of the housing comprises an elastic member.

3. The microphone assembly of claim 2, wherein
    the housing comprises:
    an outer case, formed from a hard member, and held capable of pivoting with respect to the holding case; and
    an inner case, formed from an elastic member, arranged at an inner side of the outer case and sealing the opening section to the panel.

4. The microphone assembly of claim 2, wherein
    of the holding case and the panel, one is provided with engagement hooks and the other is provided with engagement grooves.

* * * * *